(12) United States Patent
Rocholl et al.

(10) Patent No.: US 12,187,156 B2
(45) Date of Patent: *Jan. 7, 2025

(54) BATTERY STORAGE SYSTEM FOR ELECTRIC REFUSE VEHICLE

(71) Applicant: Oshkosh Corporation, Oshkosh, WI (US)

(72) Inventors: Joshua D. Rocholl, Rochester, MN (US); Derek A. Wente, Austin, MN (US); John T. Kellander, Oronoco, MN (US); Cody D. Clifton, Mapleton, MN (US); Vincent Hoover, Byron, MN (US); Zachary L. Klein, Rochester, MN (US); Clinton T. Weckwerth, Pine Island, MN (US); Skylar A. Wachter, Dodge Center, MN (US); Chad Smith, Omro, WI (US); Neil Dekarske, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/974,860

(22) Filed: Oct. 27, 2022

(65) Prior Publication Data

US 2023/0047275 A1 Feb. 16, 2023

Related U.S. Application Data

(63) Continuation of application No. 17/362,178, filed on Jun. 29, 2021, now Pat. No. 11,505,083, which is a
(Continued)

(51) Int. Cl.
*B60L 53/80* (2019.01)
*B60K 1/04* (2019.01)
*B60L 50/60* (2019.01)
*B60L 50/64* (2019.01)
*B65F 3/00* (2006.01)

(52) U.S. Cl.
CPC ............... *B60L 53/80* (2019.02); *B60L 50/64* (2019.02); *B60L 50/66* (2019.02); *B65F 3/00* (2013.01); *B60K 2001/0416* (2013.01); *B60K 2001/045* (2013.01); *B60K 2001/0461* (2013.01)

(58) Field of Classification Search
CPC .......... B60L 50/64; B60L 50/66; B60L 53/80; B50K 1/04
See application file for complete search history.

(56) References Cited

U.S. PATENT DOCUMENTS 3,817,415 A 6/1974 Lewis
4,248,323 A 2/1981 Gaffney
(Continued)

FOREIGN PATENT DOCUMENTS

CN 201530302 U 7/2010
CN 106515413 A 3/2017
(Continued)

*Primary Examiner* — Katy M Ebner
(74) *Attorney, Agent, or Firm* — Foley & Lardner LLP

(57) ABSTRACT

A refuse vehicle includes a chassis, a body assembly, and battery cells. The body assembly is coupled to the chassis and defines a refuse compartment. The battery cells are positioned between the body assembly and the chassis.

18 Claims, 13 Drawing Sheets

Related U.S. Application Data continuation of application No. 17/007,622, filed on Aug. 31, 2020, now Pat. No. 11,148,550, which is a continuation of application No. 16/851,149, filed on Apr. 17, 2020.

(60) Provisional application No. 62/842,934, filed on May 3, 2019.

(56) References Cited

U.S. PATENT DOCUMENTS

| | | | |
|---|---|---|---|
| 5,171,121 A | 12/1992 | Smith et al. | |
| 5,697,741 A | 12/1997 | Harris et al. | |
| 5,779,300 A | 7/1998 | McNeilus et al. | |
| 5,829,946 A | 11/1998 | McNeilus et al. | |
| 5,919,027 A | 7/1999 | Christenson | |
| 5,931,628 A | 8/1999 | Christenson | |
| 5,934,858 A | 8/1999 | Christenson | |
| 5,934,867 A | 8/1999 | Christenson | |
| 5,938,394 A | 8/1999 | Christenson | |
| 5,951,235 A | 9/1999 | Young et al. | |
| 5,967,731 A | 10/1999 | Brandt | |
| 5,984,609 A | 11/1999 | Bartlett | |
| 6,033,176 A | 3/2000 | Bartlett | |
| 6,062,803 A | 5/2000 | Christenson | |
| 6,089,813 A | 7/2000 | McNeilus et al. | |
| 6,120,235 A | 9/2000 | Humphries et al. | |
| 6,123,500 A | 9/2000 | McNeilus et al. | |
| 6,210,094 B1 | 4/2001 | McNeilus et al. | |
| 6,213,706 B1 | 4/2001 | Christenson | |
| 6,224,318 B1 | 5/2001 | McNeilus et al. | |
| 6,247,713 B1 | 6/2001 | Konop | |
| 6,290,450 B1 | 9/2001 | Humphries et al. | |
| 6,315,515 B1 | 11/2001 | Young et al. | |
| 6,336,783 B1 | 1/2002 | Young et al. | |
| 6,350,098 B1 | 2/2002 | Christenson et al. | |
| 6,447,239 B2 | 9/2002 | Young et al. | |
| 6,474,928 B1 | 11/2002 | Christenson | |
| 6,478,317 B2 | 11/2002 | Konop | |
| 6,485,079 B1 | 11/2002 | Brown et al. | |
| 6,527,495 B2 | 3/2003 | Humphries et al. | |
| 6,565,305 B2 | 5/2003 | Schrafel | |
| 6,666,491 B2 | 12/2003 | Schrafel | |
| 6,918,721 B2 | 7/2005 | Venton-Walters et al. | |
| 6,997,506 B2 | 2/2006 | Hecker | |
| 7,055,880 B2 | 6/2006 | Archer | |
| 7,070,382 B2 | 7/2006 | Pruteanu et al. | |
| 7,073,847 B2 | 7/2006 | Morrow et al. | |
| 7,111,858 B2 | 9/2006 | Manser et al. | |
| 7,118,314 B2 | 10/2006 | Zhou et al. | |
| 7,140,461 B2 | 11/2006 | Morrow | |
| 7,198,130 B2 | 4/2007 | Schimke | |
| 7,226,080 B2 | 6/2007 | Humphries | |
| 7,264,305 B2 | 9/2007 | Kuriakose | |
| 7,270,346 B2 | 9/2007 | Rowe et al. | |
| 7,284,943 B2 | 10/2007 | Pruteanu et al. | |
| 7,302,320 B2 | 11/2007 | Nasr et al. | |
| 7,357,203 B2 | 4/2008 | Morrow et al. | |
| 7,370,904 B2 | 5/2008 | Wood et al. | |
| 7,379,797 B2 | 5/2008 | Nasr et al. | |
| 7,419,021 B2 | 9/2008 | Morrow et al. | |
| 7,448,460 B2 | 11/2008 | Morrow et al. | |
| 7,517,005 B2 | 4/2009 | Kuriakose | |
| 7,520,354 B2 | 4/2009 | Morrow et al. | |
| 7,521,814 B2 | 4/2009 | Nasr | |
| 7,556,468 B2 | 7/2009 | Grata | |
| 7,559,735 B2 | 7/2009 | Pruteanu et al. | |
| 7,621,580 B2 | 11/2009 | Randjelovic et al. | |
| 7,823,948 B2 | 11/2010 | Redman et al. | |
| 7,848,857 B2 | 12/2010 | Nasr et al. | |
| 7,878,750 B2 | 2/2011 | Zhou et al. | |
| 7,931,103 B2 | 4/2011 | Morrow et al. | |
| 7,937,194 B2 | 5/2011 | Nasr et al. | |
| 7,954,882 B2 | 6/2011 | Brummel et al. | |
| 8,000,850 B2 | 8/2011 | Nasr et al. | |
| 8,152,216 B2 | 4/2012 | Howell et al. | |
| 8,182,194 B2 | 5/2012 | Pruteanu et al. | |
| 8,337,352 B2 | 12/2012 | Morrow et al. | |
| 8,360,706 B2 | 1/2013 | Addleman et al. | |
| 8,376,439 B2 | 2/2013 | Kuriakose et al. | |
| 8,397,853 B2 | 3/2013 | Stefani et al. | |
| 8,540,475 B2 | 9/2013 | Kuriakose et al. | |
| 8,561,735 B2 | 10/2013 | Morrow et al. | |
| 8,616,319 B2 | 12/2013 | Yokoyama et al. | |
| 8,789,635 B2 * | 7/2014 | Franzen | B60L 15/38 180/68.5 |
| 8,794,886 B1 | 8/2014 | Nett et al. | |
| 8,807,613 B2 | 8/2014 | Howell et al. | |
| 8,864,613 B2 | 10/2014 | Morrow et al. | |
| 8,936,124 B2 | 1/2015 | Auer et al. | |
| 8,967,699 B1 | 3/2015 | Richmond et al. | |
| 9,061,712 B2 | 6/2015 | Patberg et al. | |
| 9,114,804 B1 | 8/2015 | Shukla et al. | |
| 9,114,930 B2 | 8/2015 | Simmons | |
| 9,132,736 B1 | 9/2015 | Shukla et al. | |
| 9,174,686 B1 | 11/2015 | Messina et al. | |
| 9,216,856 B2 | 12/2015 | Howell et al. | |
| 9,328,986 B1 | 5/2016 | Pennau et al. | |
| 9,366,507 B1 | 6/2016 | Richmond et al. | |
| 9,376,102 B1 | 6/2016 | Shukla et al. | |
| 9,387,985 B2 | 7/2016 | Gillmore et al. | |
| 9,428,042 B2 | 8/2016 | Morrow et al. | |
| 9,452,750 B2 | 9/2016 | Shukla et al. | |
| 9,493,093 B2 | 11/2016 | Stingle et al. | |
| 9,494,170 B2 | 11/2016 | Hou | |
| 9,533,569 B2 | 1/2017 | Mckinney | |
| 9,579,969 B2 | 2/2017 | Crist et al. | |
| 9,598,235 B2 | 3/2017 | Vasilescu et al. | |
| 9,630,483 B2 * | 4/2017 | Yamada | B60K 1/04 |
| 9,694,671 B2 | 7/2017 | Wildgrube et al. | |
| 9,694,776 B2 | 7/2017 | Nelson et al. | |
| 9,707,869 B1 | 7/2017 | Messina et al. | |
| 9,731,594 B2 | 8/2017 | Wildgrube | |
| 9,738,186 B2 | 8/2017 | Krueger et al. | |
| 9,821,789 B2 | 11/2017 | Shukla et al. | |
| 9,880,581 B2 | 1/2018 | Kuriakose et al. | |
| 9,956,860 B2 | 5/2018 | Tsuji | |
| 9,981,803 B2 | 5/2018 | Davis et al. | |
| 10,021,467 B1 | 7/2018 | Dunbar | |
| 10,029,556 B2 | 7/2018 | Morrow et al. | |
| 10,035,648 B2 | 7/2018 | Haddick et al. | |
| 10,099,622 B2 | 10/2018 | Handschke et al. | |
| 10,106,032 B2 | 10/2018 | Crist et al. | |
| 10,166,883 B2 | 1/2019 | Brendecke et al. | |
| 10,196,205 B2 | 2/2019 | Betz et al. | |
| 10,315,643 B2 | 6/2019 | Shukla et al. | |
| 10,351,340 B2 | 7/2019 | Haddick et al. | |
| 10,392,000 B2 | 8/2019 | Shukla et al. | |
| 10,414,067 B2 | 9/2019 | Datema et al. | |
| 10,414,266 B1 | 9/2019 | Wiegand et al. | |
| 10,421,345 B2 * | 9/2019 | Kerspe | B60P 3/20 |
| 10,434,949 B2 | 10/2019 | Handschke et al. | |
| 10,456,610 B1 | 10/2019 | Betz et al. | |
| 10,457,134 B2 | 10/2019 | Morrow et al. | |
| 10,457,533 B2 | 10/2019 | Puszkiewicz et al. | |
| D869,332 S | 12/2019 | Gander et al. | |
| 10,493,837 B1 * | 12/2019 | Angelo | B60L 50/66 |
| 10,500,975 B1 | 12/2019 | Healy | |
| 10,513,392 B2 | 12/2019 | Haddick et al. | |
| 10,545,010 B1 | 1/2020 | Leeman et al. | |
| 10,556,622 B1 | 2/2020 | Calliari et al. | |
| 10,558,234 B2 | 2/2020 | Kuriakose et al. | |
| 10,589,788 B1 * | 3/2020 | Milton | B62D 21/02 |
| 10,611,416 B1 | 4/2020 | Groteleuschen et al. | |
| 10,618,405 B2 | 4/2020 | Crist et al. | |
| 10,688,856 B2 | 6/2020 | Kasai et al. | |
| 10,781,090 B2 | 9/2020 | Puszkiewicz et al. | |
| 10,800,605 B2 | 10/2020 | Rocholl et al. | |
| 10,843,379 B2 | 11/2020 | Rocholl et al. | |
| 10,843,549 B2 | 11/2020 | Morrow et al. | |
| 10,858,184 B2 | 12/2020 | Betz et al. | |
| 10,858,231 B2 | 12/2020 | Holmes et al. | |
| 10,859,167 B2 | 12/2020 | Jax et al. | |
| 10,899,538 B2 | 1/2021 | Nelson et al. | |

(56) References Cited

U.S. PATENT DOCUMENTS

| | | |
|---|---|---|
| 10,901,409 B2 | 1/2021 | Datema et al. |
| 10,913,346 B2 | 2/2021 | Wiegand et al. |
| 10,940,610 B2 | 3/2021 | Clifton et al. |
| 10,994,929 B2 | 5/2021 | Haddick et al. |
| 10,997,802 B2 | 5/2021 | Koga et al. |
| 11,001,135 B2 | 5/2021 | Yakes et al. |
| 11,001,440 B2 | 5/2021 | Rocholl et al. |
| 11,007,863 B2 | 5/2021 | Yakes et al. |
| 11,020,621 B2 | 6/2021 | Betz et al. |
| 11,021,078 B2 | 6/2021 | Rocholl et al. |
| 11,040,610 B2 * | 6/2021 | Sloan ................ B60L 50/64 |
| 11,042,745 B2 | 6/2021 | Wildgrube et al. |
| 11,042,750 B2 | 6/2021 | Wildgrube et al. |
| 11,046,329 B2 | 6/2021 | Clifton et al. |
| 11,052,899 B2 | 7/2021 | Shukla et al. |
| 11,059,436 B2 | 7/2021 | Wildgrube et al. |
| 11,110,977 B2 | 9/2021 | Smith et al. |
| 2002/0025245 A1 | 2/2002 | Humphries et al. |
| 2002/0159870 A1 | 10/2002 | Pruteanu et al. |
| 2003/0047956 A1 | 3/2003 | Schrafel |
| 2003/0230412 A1 | 12/2003 | Archer |
| 2003/0231944 A1 | 12/2003 | Weller et al. |
| 2004/0071537 A1 | 4/2004 | Pruteanu et al. |
| 2004/0156706 A1 | 8/2004 | Weller et al. |
| 2004/0165977 A1 | 8/2004 | Hecker |
| 2004/0228699 A1 | 11/2004 | Venton-Walters et al. |
| 2006/0039771 A1 | 2/2006 | Zhou |
| 2006/0045700 A1 | 3/2006 | Siebers et al. |
| 2006/0055206 A1 | 3/2006 | Morrow et al. |
| 2006/0087152 A1 | 4/2006 | Kuriakose |
| 2007/0138817 A1 | 6/2007 | Calliari et al. |
| 2007/0154294 A1 | 7/2007 | Shim et al. |
| 2007/0222253 A1 | 9/2007 | Wood et al. |
| 2007/0296248 A1 | 12/2007 | Kuriakose |
| 2008/0012280 A1 | 1/2008 | Humphries |
| 2008/0036232 A1 | 2/2008 | Randjelovic et al. |
| 2008/0038106 A1 | 2/2008 | Spain |
| 2008/0129068 A1 | 6/2008 | Brummel et al. |
| 2008/0150350 A1 | 6/2008 | Morrow et al. |
| 2008/0237285 A1 | 10/2008 | Calliari |
| 2008/0284188 A1 | 11/2008 | Redman et al. |
| 2009/0194347 A1 | 8/2009 | Morrow et al. |
| 2010/0052357 A1 | 3/2010 | Howell et al. |
| 2010/0166531 A1 | 7/2010 | Bauer et al. |
| 2010/0320012 A1 * | 12/2010 | Stappen ................ B60L 53/80 180/65.1 |
| 2011/0233952 A1 | 9/2011 | Kuriakose et al. |
| 2012/0111654 A1 | 5/2012 | Origuchi |
| 2012/0282077 A1 | 11/2012 | Alberts et al. |
| 2013/0037337 A1 * | 2/2013 | Auer ................ H01M 50/244 180/68.5 |
| 2013/0199863 A1 | 8/2013 | Robbins |
| 2013/0327583 A1 | 12/2013 | Nitawaki et al. |
| 2014/0367954 A1 | 12/2014 | McKinney |
| 2015/0043231 A1 | 2/2015 | Clark |
| 2015/0059598 A1 | 3/2015 | Philipp et al. |
| 2015/0151651 A1 | 6/2015 | Stingle et al. |
| 2015/0353150 A1 | 12/2015 | Ursich et al. |
| 2016/0185243 A1 | 6/2016 | Zhou et al. |
| 2016/0276638 A1 | 9/2016 | Sham |
| 2016/0375805 A1 | 12/2016 | Krueger et al. |
| 2017/0158070 A1 | 6/2017 | Salasoo |
| 2017/0341860 A1 | 11/2017 | Dodds et al. |
| 2017/0361491 A1 | 12/2017 | Datema et al. |
| 2018/0056769 A1 | 3/2018 | Kerspe et al. |
| 2018/0250847 A1 | 9/2018 | Wurtz et al. |
| 2018/0265289 A1 | 9/2018 | Davis et al. |
| 2019/0039407 A1 | 2/2019 | Smith |
| 2019/0077254 A1 | 3/2019 | Stanley |
| 2019/0081298 A1 | 3/2019 | Matecki et al. |
| 2019/0091890 A1 | 3/2019 | Rocholl et al. |
| 2019/0121353 A1 | 4/2019 | Datema et al. |
| 2019/0185077 A1 | 6/2019 | Smith et al. |
| 2019/0193934 A1 | 6/2019 | Rocholl et al. |
| 2019/0202312 A1 * | 7/2019 | Aufdencamp ........... B60K 6/52 |
| 2019/0291559 A1 | 9/2019 | Trenne et al. |
| 2019/0291560 A1 * | 9/2019 | Lampsa ................ B60K 1/04 |
| 2019/0291711 A1 | 9/2019 | Shukla et al. |
| 2019/0292975 A1 | 9/2019 | Hou et al. |
| 2019/0322321 A1 | 10/2019 | Schwartz et al. |
| 2019/0325220 A1 | 10/2019 | Wildgrube et al. |
| 2019/0344475 A1 | 11/2019 | Datema et al. |
| 2019/0360600 A1 | 11/2019 | Jax et al. |
| 2020/0078986 A1 | 3/2020 | Clifton et al. |
| 2020/0083573 A1 | 3/2020 | Caliskan et al. |
| 2020/0096953 A1 | 3/2020 | Stalker et al. |
| 2020/0139804 A1 | 5/2020 | Holmes et al. |
| 2020/0148073 A1 | 5/2020 | Sasu |
| 2020/0158474 A1 | 5/2020 | Leeman et al. |
| 2020/0164760 A1 | 5/2020 | Sohmshetty et al. |
| 2020/0230841 A1 | 7/2020 | Datema et al. |
| 2020/0230842 A1 | 7/2020 | Datema et al. |
| 2020/0231035 A1 | 7/2020 | Crist et al. |
| 2020/0247486 A1 | 8/2020 | Groteleuschen et al. |
| 2020/0262328 A1 | 8/2020 | Nelson et al. |
| 2020/0262366 A1 | 8/2020 | Wildgrube et al. |
| 2020/0265656 A1 | 8/2020 | Koga et al. |
| 2020/0316816 A1 | 10/2020 | Messina et al. |
| 2020/0317083 A1 | 10/2020 | Messina et al. |
| 2020/0321573 A1 | 10/2020 | Confer |
| 2020/0335840 A1 | 10/2020 | Sloan et al. |
| 2020/0346547 A1 | 11/2020 | Rocholl et al. |
| 2020/0346556 A1 | 11/2020 | Rocholl et al. |
| 2020/0346557 A1 | 11/2020 | Rocholl et al. |
| 2020/0346657 A1 | 11/2020 | Clifton et al. |
| 2020/0346854 A1 | 11/2020 | Rocholl et al. |
| 2020/0346855 A1 | 11/2020 | Rocholl et al. |
| 2020/0346856 A1 | 11/2020 | Rocholl et al. |
| 2020/0346857 A1 | 11/2020 | Rocholl et al. |
| 2020/0346858 A1 | 11/2020 | Buege et al. |
| 2020/0346859 A1 | 11/2020 | Buege et al. |
| 2020/0346860 A1 | 11/2020 | Buege et al. |
| 2020/0346861 A1 | 11/2020 | Rocholl et al. |
| 2020/0346862 A1 | 11/2020 | Rocholl et al. |
| 2020/0347659 A1 | 11/2020 | Rocholl et al. |
| 2020/0347661 A1 | 11/2020 | Rocholl et al. |
| 2020/0347857 A1 | 11/2020 | Clifton et al. |
| 2020/0348681 A1 | 11/2020 | Clifton et al. |
| 2020/0348764 A1 | 11/2020 | Clifton et al. |
| 2020/0358150 A1 | 11/2020 | Fields et al. |
| 2020/0369334 A1 | 11/2020 | Lee |
| 2020/0376977 A1 | 12/2020 | Lee et al. |
| 2020/0398628 A1 | 12/2020 | Schardt et al. |
| 2020/0398670 A1 | 12/2020 | Rocholl et al. |
| 2020/0398695 A1 | 12/2020 | Rocholl et al. |
| 2020/0398697 A1 | 12/2020 | Rocholl et al. |
| 2020/0398772 A1 | 12/2020 | Wildgrube et al. |
| 2020/0399057 A1 | 12/2020 | Rocholl et al. |
| 2020/0399058 A1 | 12/2020 | Rocholl et al. |
| 2020/0402325 A1 | 12/2020 | Koga et al. |
| 2021/0002112 A1 | 1/2021 | Puszkiewicz et al. |
| 2021/0031611 A1 | 2/2021 | Yakes et al. |
| 2021/0031612 A1 | 2/2021 | Yakes et al. |
| 2021/0031649 A1 | 2/2021 | Messina et al. |
| 2021/0039719 A1 | 2/2021 | Datema et al. |
| 2021/0054942 A1 | 2/2021 | Jax et al. |
| 2021/0069934 A1 | 3/2021 | Rocholl et al. |
| 2021/0086991 A1 | 3/2021 | Betz et al. |
| 2021/0122229 A1 | 4/2021 | Wiegand et al. |
| 2021/0124347 A1 | 4/2021 | Datema et al. |
| 2021/0139237 A1 | 5/2021 | Nelson et al. |
| 2021/0143663 A1 | 5/2021 | Bolton |
| 2021/0155224 A1 | 5/2021 | McKibben et al. |
| 2021/0162630 A1 | 6/2021 | Clifton et al. |
| 2021/0188069 A1 | 6/2021 | Friedman |
| 2021/0188076 A1 | 6/2021 | Morrow et al. |
| 2021/0214156 A1 | 7/2021 | Haddick et al. |
| 2021/0218101 A1 | 7/2021 | Menon et al. |
| 2021/0221216 A1 | 7/2021 | Yakes et al. |
| 2021/0225095 A1 | 7/2021 | Koga et al. |
| 2021/0229755 A1 | 7/2021 | Schwartz et al. |
| 2021/0229908 A1 | 7/2021 | Rocholl et al. |
| 2021/0339648 A1 | 11/2021 | Koga et al. |
| 2021/0362579 A1 * | 11/2021 | Kumagai ................ B62D 21/02 |

(56) References Cited

U.S. PATENT DOCUMENTS

| | | |
|---|---|---|
| 2022/0111716 A1 | 4/2022 | McKibben et al. |
| 2022/0169252 A1 | 6/2022 | Yhr |
| 2022/0194489 A1 | 6/2022 | Roche et al. |
| 2022/0348113 A1 | 11/2022 | Delrieu et al. |

FOREIGN PATENT DOCUMENTS

| | | | |
|---|---|---|---|
| CN | 106275084 A | 7/2018 | |
| CN | 107825950 A | 8/2018 | |
| CN | 109203960 A | 1/2019 | |
| CN | 107264253 A | 12/2020 | |
| DE | 10 2012 007 875 A1 | 10/2013 | |
| DE | 20 2016 006 076 U1 | 12/2016 | |
| DE | 10 2017 009 176 A1 | 3/2021 | |
| FR | 3043600 A1 | 11/2018 | |
| GB | 2 492 148 A | 12/2012 | |
| WO | WO-2012067506 A1 * | 5/2012 | ............... B65F 3/00 |
| WO | WO-2014/161557 A1 | 10/2014 | |
| WO | WO-2017/064582 A1 | 4/2017 | |
| WO | WO-2017/162787 A1 | 9/2017 | |
| WO | WO-2020/090171 A1 | 5/2020 | |

\* cited by examiner

BATTERY STORAGE SYSTEM FOR ELECTRIC REFUSE VEHICLE

CROSS-REFERENCE TO RELATED PATENT APPLICATIONS

This application is a continuation of U.S. patent application Ser. No. 17/362,178, filed Jun. 29, 2021, which is a continuation of U.S. patent application Ser. No. 17/007,622, filed Aug. 31, 2020, which is a continuation of U.S. patent application Ser. No. 16/851,149, filed Apr. 17, 2020, which claims the benefit of and priority to U.S. Provisional Patent Application No. 62/842,934, filed on May 3, 2019, all of which are incorporated herein by reference in their entireties.

BACKGROUND

Refuse vehicles collect a wide variety of waste, trash, and other material from residences and businesses. Operators of the refuse vehicles transport the material from various waste receptacles within a municipality to a storage or processing facility (e.g., a landfill, an incineration facility, a recycling facility, etc.).

SUMMARY

One embodiment relates to a refuse vehicle including a chassis, a body assembly, and battery cells. The body assembly is coupled to the chassis and defines a refuse compartment. The battery cells are positioned between the body assembly and the chassis.

In some embodiments, the refuse vehicle includes an electric energy system. The electric energy system includes the battery cells and control hardware, according to some embodiments. The electric energy system is detachably coupled to the body assembly between the body assembly and the chassis, according to some embodiments. The battery cells of the electric energy system are replaceable, according to some embodiments.

In some embodiments, battery cells are detachably coupled to a first portion of the body assembly. In some embodiments, the control hardware is detachably coupled to a second portion of the body assembly distinct from the first portion.

In some embodiments, the refuse vehicle is fully powered by the plurality of battery cells.

In some embodiments, the refuse vehicle does not include a combustion engine.

In some embodiments, the battery cells are configured to provide electrical energy to an electric actuator of the refuse vehicle.

In some embodiments, the battery cells are positioned within a housing. In some embodiments, the housing is coupled with the refuse vehicle between the chassis and the body assembly.

In some embodiments, the battery cells are positioned beneath the refuse compartment of the body assembly.

In some embodiments, the battery cells extend at least partially upwards past a bottom surface of the body assembly.

In some embodiments, the battery cells are spaced a distance beneath a bottom of the body assembly.

In some embodiments, the battery cells are positioned above a rear axle of the refuse vehicle, beneath the body assembly.

Another embodiment relates to a refuse vehicle including a chassis, a body assembly, an battery cells. The body assembly is coupled to the chassis and defines a refuse compartment. The battery cells are positioned beneath the body assembly, the refuse compartment of the body assembly, and a portion of the chassis.

In some embodiments, the refuse vehicle is fully powered by the plurality of battery cells.

In some embodiments, the refuse vehicle does not include a combustion engine.

In some embodiments, the battery cells are positioned in a housing that extends in a longitudinal direction along a length of the body assembly.

In some embodiments, the battery cells are positioned at least partially above a tractive element of the refuse vehicle.

In some embodiments, the battery cells are coupled with a rearward bottom portion of the body assembly.

In some embodiments, the battery cells are coupled with a forward bottom portion of the body assembly.

Another embodiment relates to a refuse vehicle including a chassis, a body assembly, and battery cells. The body assembly is coupled to the chassis and defines a refuse compartment. The battery cells are coupled with a bottom portion of the body assembly at least partially beneath the body assembly.

In some embodiments, the battery cells are coupled with a rearward bottom portion of the body assembly or a forward bottom portion of the body assembly.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, an energy storage and/or generation system for a refuse vehicle is disclosed herein. The energy storage and/or generation system of the present disclosure provides many advantages over conventional systems. The energy storage and/or generation system may be positioned to evenly distribute the weight of batteries across the frame of the refuse vehicle and/or minimize component stress of one or more load bearing members (e.g., an axle) of the refuse vehicle. The energy storage and/or generation system may be positioned to be easily accessible and/or removable from the refuse vehicle. Ease of access and removability reduce the labor involved in servicing an energy storage and/or generation system, making routine inspection and servicing more feasible and thereby increasing the life of the energy storage and/or generation system. Furthermore, removability allows the energy storage and/or generation system to be "hot-swapped" when it is depleted of charge for a fresh battery, thereby enabling greater uptime for a refuse vehicle. In addition, a removable energy storage and/or generation system may be safely charged at greater speeds than an energy storage and/or generation system confined to a refuse vehicle, thereby allowing for a smaller number of energy storage and/or generation systems to be used to support a fleet of refuse vehicles. Finally, the energy storage and/or generation system may be modular, allowing individual components of the energy storage and/or generation system to be easily replaced for one another. Modularity not only reduces maintenance costs but also allows for future upgrades to the energy storage and/or generation system. For example, the batteries of the energy storage and/or generation system may be easily upgraded to future chemistries not yet available.

Overall Vehicle

Figure 1:
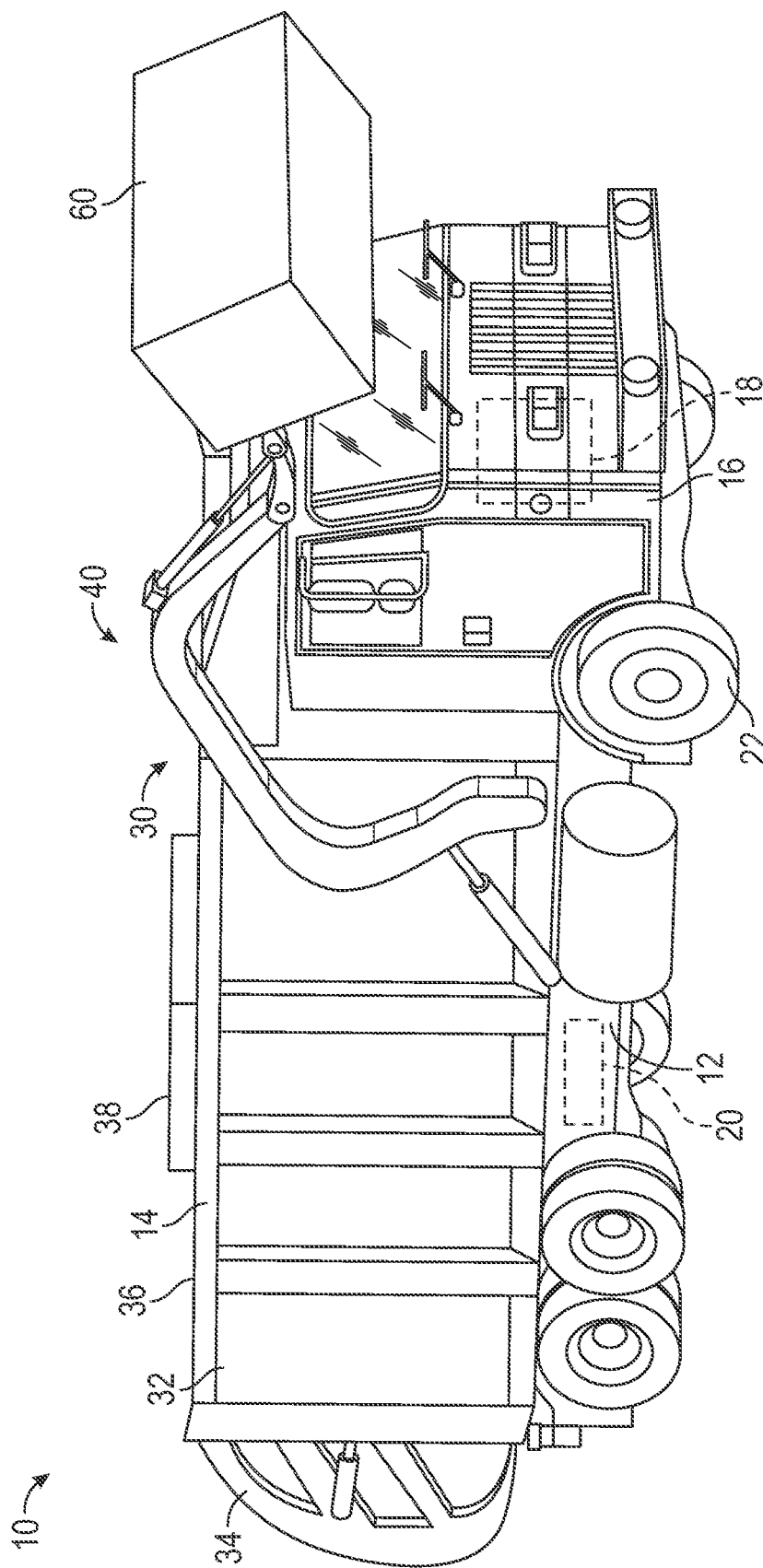
FIG. 1 is a perspective view of a refuse vehicle, according to an exemplary embodiment.

As shown in FIG. 1, a vehicle, shown as refuse vehicle 10 (e.g., a garbage truck, a waste collection truck, a sanitation truck, a recycling truck, etc.), is configured as a front-loading refuse truck. In other embodiments, the refuse vehicle 10 is configured as a side-loading refuse truck or a rear-loading refuse truck. In still other embodiments, the vehicle is another type of vehicle (e.g., a skid-loader, a telehandler, a plow truck, a boom lift, etc.). As shown in FIG. 1, the refuse vehicle 10 includes a chassis, shown as frame 12; a body assembly, shown as body 14, coupled to the frame 12 (e.g., at a rear end thereof, etc.); and a cab, shown as cab 16, coupled to the frame 12 (e.g., at a front end thereof, etc.). The cab 16 may include various components to facilitate operation of the refuse vehicle 10 by an operator (e.g., a seat, a steering wheel, actuator controls, a user interface, switches, buttons, dials, etc.).

As shown in FIG. 1, the refuse vehicle 10 includes a prime mover, shown as electric motor 18, and an energy system, shown as energy storage and/or generation system 20. In other embodiments, the prime mover is or includes an internal combustion engine. According to the exemplary embodiment shown in FIG. 1, the electric motor 18 is coupled to the frame 12 at a position beneath the cab 16. The electric motor 18 is configured to provide power to a plurality of tractive elements, shown as wheels 22 (e.g., via a drive shaft, axles, etc.). In other embodiments, the electric motor 18 is otherwise positioned and/or the refuse vehicle 10 includes a plurality of electric motors to facilitate independently driving one or more of the wheels 22. In still other embodiments, the electric motor 18 or a secondary electric motor is coupled to and configured to drive a hydraulic system that powers hydraulic actuators. According to the exemplary embodiment shown in FIG. 1, the energy storage and/or generation system 20 is coupled to the frame 12 beneath the body 14. In other embodiments, the energy storage and/or generation system 20 is otherwise positioned (e.g., within a tailgate of the refuse vehicle 10, beneath the cab 16, along the top of the body 14, within the body 14, etc.).

According to an exemplary embodiment, the energy storage and/or generation system 20 is configured to (a) receive, generate, and/or store power and (b) provide electric power to (i) the electric motor 18 to drive the wheels 22, (ii) electric actuators of the refuse vehicle 10 to facilitate operation thereof (e.g., lift actuators, tailgate actuators, packer actuators, grabber actuators, etc.), and/or (iii) other electrically operated accessories of the refuse vehicle 10 (e.g., displays, lights, etc.). The energy storage and/or generation system 20 may include one or more rechargeable batteries (e.g., lithium-ion batteries, nickel-metal hydride batteries, lithium-ion polymer batteries, lead-acid batteries, nickel-cadmium batteries, etc.), capacitors, solar cells, generators, power buses, etc. In one embodiment, the refuse vehicle 10 is a completely electric refuse vehicle. In other embodiments, the refuse vehicle 10 includes an internal combustion generator that utilizes one or more fuels (e.g., gasoline, diesel, propane, natural gas, hydrogen, etc.) to generate electricity to charge the energy storage and/or generation system 20, power the electric motor 18, power the electric actuators, and/or power the other electrically operated accessories (e.g., a hybrid refuse vehicle, etc.). For example, the refuse vehicle 10 may have an internal combustion engine augmented by the electric motor 18 to cooperatively provide power to the wheels 22. The energy storage and/or generation system 20 may thereby be charged via an on-board generator (e.g., an internal combustion generator, a solar panel system, etc.), from an external power source (e.g., overhead power lines, mains power source through a charging input, etc.), and/or via a power regenerative braking system, and provide power to the electrically operated systems of the refuse vehicle 10. In some embodiments, the energy storage and/or generation system 20 includes a heat management system (e.g., liquid cooling, heat exchanger, air cooling, etc.).

According to an exemplary embodiment, the refuse vehicle 10 is configured to transport refuse from various waste receptacles within a municipality to a storage and/or processing facility (e.g., a landfill, an incineration facility, a recycling facility, etc.). As shown in FIG. 1, the body 14 includes a plurality of panels, shown as panels 32, a tailgate 34, and a cover 36. The panels 32, the tailgate 34, and the cover 36 define a collection chamber (e.g., hopper, etc.), shown as refuse compartment 30. Loose refuse may be placed into the refuse compartment 30 where it may thereafter be compacted (e.g., by a packer system, etc.). The refuse compartment 30 may provide temporary storage for refuse during transport to a waste disposal site and/or a recycling facility. In some embodiments, at least a portion of the body 14 and the refuse compartment 30 extend above or in front of the cab 16. According to the embodiment shown in FIG. 1, the body 14 and the refuse compartment 30 are positioned behind the cab 16. In some embodiments, the refuse compartment 30 includes a hopper volume and a storage volume. Refuse may be initially loaded into the hopper volume and thereafter compacted into the storage volume. According to an exemplary embodiment, the hopper volume is positioned between the storage volume and the cab 16 (e.g., refuse is loaded into a position of the refuse compartment 30 behind the cab 16 and stored in a position further toward the rear of the refuse compartment 30, a front-loading refuse vehicle, a side-loading refuse vehicle, etc.). In other embodiments, the storage volume is positioned between the hopper volume and the cab 16 (e.g., a rear-loading refuse vehicle, etc.).

As shown in FIG. 1, the refuse vehicle 10 includes a lift mechanism/system (e.g., a front-loading lift assembly, etc.), shown as lift assembly 40, coupled to the front end of the body 14. In other embodiments, the lift assembly 40 extends rearward of the body 14 (e.g., a rear-loading refuse vehicle, etc.). In still other embodiments, the lift assembly 40 extends from a side of the body 14 (e.g., a side-loading refuse vehicle, etc.). As shown in FIG. 1, the lift assembly 40 is configured to engage a container (e.g., a residential trash receptacle, a commercial trash receptacle, a container having a robotic grabber arm, etc.), shown as refuse container 60. The lift assembly 40 may include various actuators (e.g., electric actuators, hydraulic actuators, pneumatic actuators, etc.) to facilitate engaging the refuse container 60, lifting the refuse container 60, and tipping refuse out of the refuse container 60 into the hopper volume of the refuse compartment 30 through an opening in the cover 36 or through the tailgate 34. The lift assembly 40 may thereafter return the empty refuse container 60 to the ground. According to an exemplary embodiment, a door, shown as top door 38, is movably coupled along the cover 36 to seal the opening thereby preventing refuse from escaping the refuse compartment 30 (e.g., due to wind, bumps in the road, etc.).

Energy Storage and/or Generation System

Figure 2:
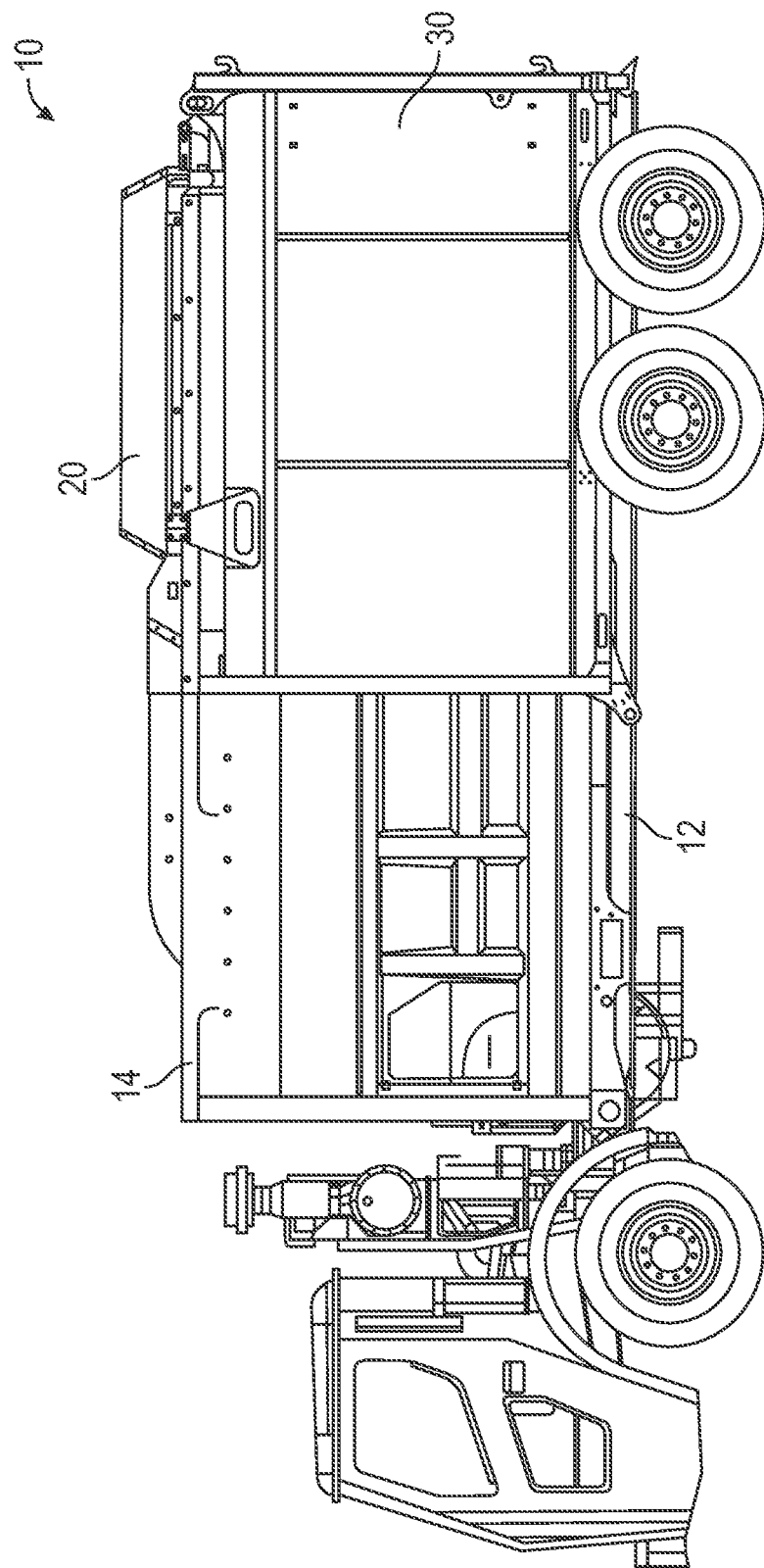
FIG. 2 is a side view of a refuse container of the refuse vehicle of FIG. 1 having a top energy storage and/or generation system, according to an exemplary embodiment.

As shown in FIG. 2, the energy storage and/or generation system 20 is coupled to the rearward top portion of the body 14. In other embodiments, the energy storage and/or generation system 20 is coupled to the forward top portion of the body 14. In some embodiments, the energy storage and/or generation system 20 is removable/detachable from the body 14. Locating the energy storage and/or generation system 20 on top of the body 14 facilitates easy access to the energy storage and/or generation system 20. For example, a user may readily inspect and service the energy storage and/or generation system 20 because it is located on an external surface of the refuse vehicle 10.

The energy storage and/or generation system 20 may include one or more attachment mechanisms (e.g., pins, linkages, latches, etc.) to couple the energy storage and/or generation system 20 to the body 14. In some embodiments, the energy storage and/or generation system 20 is a pod or battery compartment, configured to receive and electrically couple one or more batteries. For example, the energy storage and/or generation system 20 may allow a battery cell to be inserted from one end thereby coupling the battery cell to the energy storage and/or generation system 20 and providing power to the refuse vehicle 10. In some embodiments, the energy storage and/or generation system 20 is modular and facilitates easy replacement of one or more battery cells. For example, a second fully charged battery cell may replace a first depleted battery cell by uncoupling the first battery cell from the energy storage and/or generation system 20 and replacing it with the second battery cell. In some embodiments, the entire energy storage and/or generation system 20 is replaced with a different one of energy storage and/or generation system 20. Replacing one or more battery cells of the energy storage and/or generation system 20 reduces the downtime associated with charging a typical battery system. In some embodiments, the energy storage and/or generation system 20 is "hot-swappable" and is able to replace one or more battery cells without cutting power to the refuse vehicle 10.

The energy storage and/or generation system 20 may include an electric connection (e.g., a pantograph, a current collector, a high-voltage line, etc.) to allow the energy storage and/or generation system 20 to connect to external power sources (e.g., an overhead power line, the grid, a charging station, etc.). For example, the energy storage and/or generation system 20 may include a charging port to allow one or more battery cells to be charged while the energy storage and/or generation system 20 is coupled to the refuse vehicle 10 (e.g., by a 220V charger). In some embodiments, the energy storage and/or generation system 20 includes an electrical bypass to power the refuse vehicle 10 from a charging source while the battery is being charged. In some embodiments, the energy storage and/or generation system 20 connects to one or more power sources of refuse vehicle 10 (e.g., an internal combustion generator, a battery, etc.) to charge the energy storage and/or generation system 20. For example, the energy storage and/or generation system 20 may include a connection to an onboard diesel generator configured to provide power to the energy storage and/or generation system 20 for charging.

Figure 3:
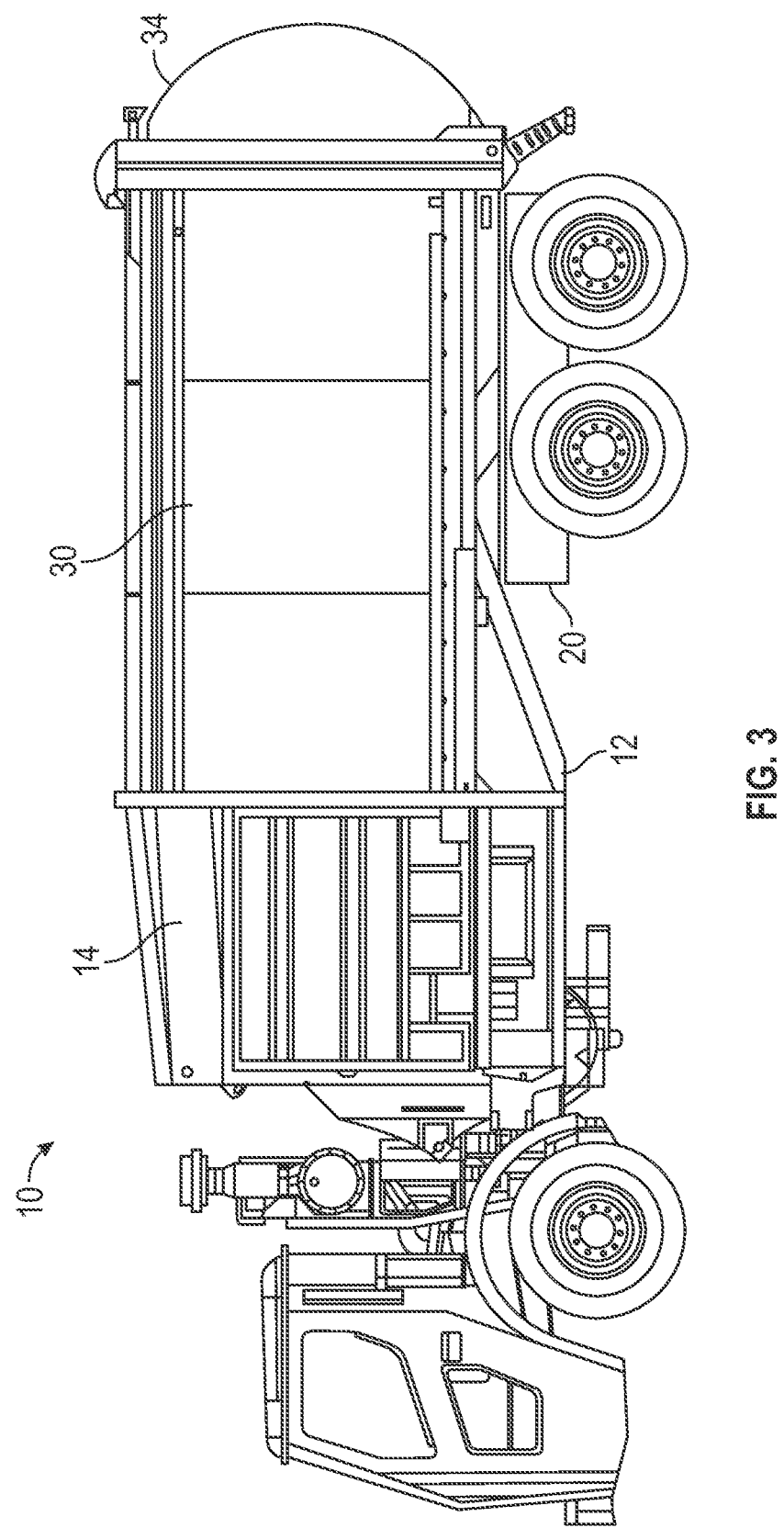
FIG. 3 is the refuse container of FIG. 1 having a bottom energy storage and/or generation system, according to an exemplary embodiment.

As shown in FIG. 3, the energy storage and/or generation system 20 is coupled to the rearward bottom portion of the body 14. In other embodiments, the energy storage and/or generation system 20 is coupled to the forward bottom portion of the body 14. As described above, the energy storage and/or generation system 20 may be removable/replaceable. For example, the refuse vehicle 10 may include a door on the side of the body 14 to allow removal and replacement of the energy storage and/or generation system 20. In some embodiments, the energy storage and/or generation system 20 is located on a track such that the energy storage and/or generation system 20 can slide out from the body 14 similar to a drawer. In some embodiments, the energy storage and/or generation system 20 is modular. For example, the energy storage and/or generation system 20 may include one or more sub-batteries to reduce the bulkiness of the energy storage and/or generation system 20 and permit easy removal and/or replacement. Modularity further enables more precise inspection and service of battery cells and allows individual battery cells to be replaced without the need to replace an entire larger array. Furthermore, modularity enables battery cells to be easily upgraded.

As described above, the energy storage and/or generation system 20 may include a charging port to allow the energy storage and/or generation system 20 to receive external power for charging. For example, the refuse vehicle 10 may include a 220V charging port on a side of the body 14 to charge the energy storage and/or generation system 20.

Figure 4:
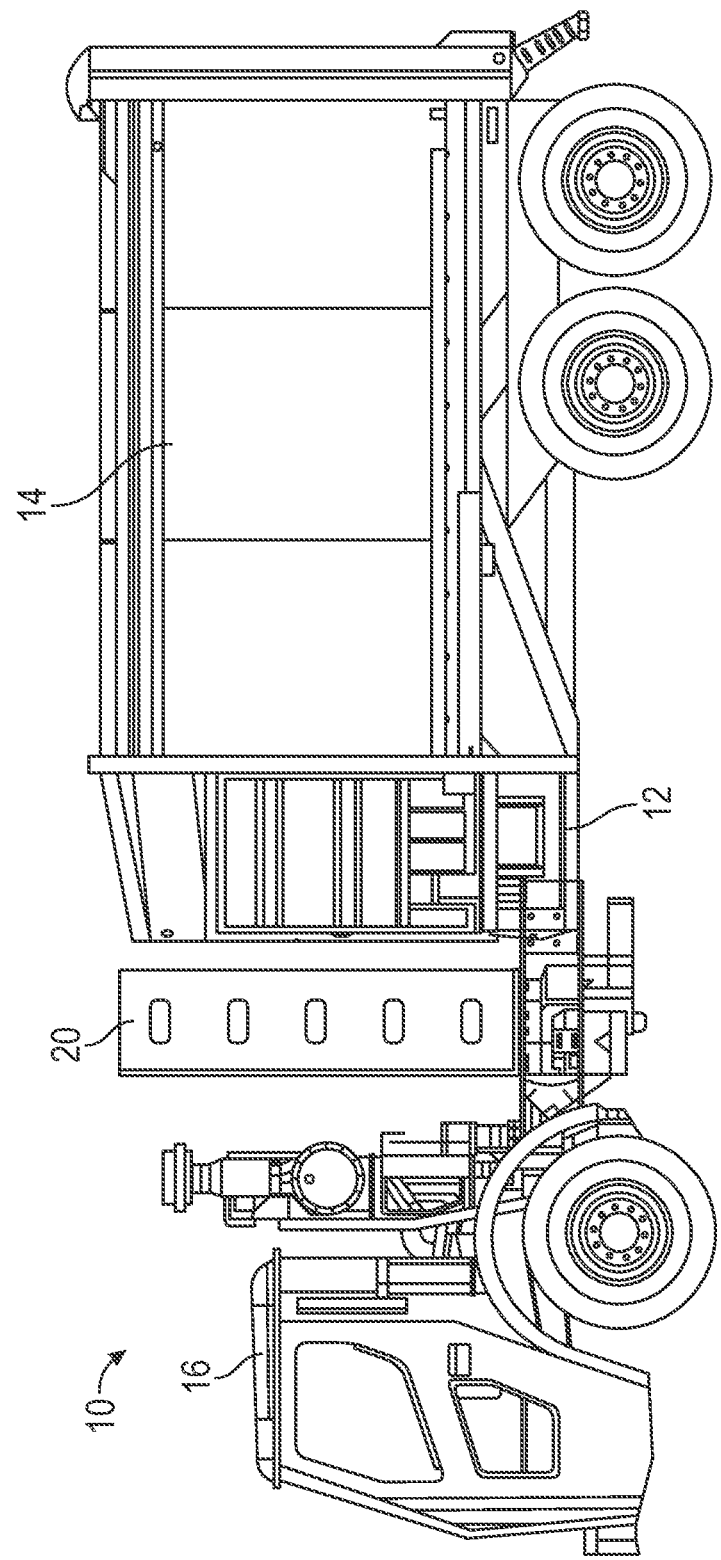
FIG. 4 is the refuse vehicle of FIG. 1 having a centralized energy storage and/or generation system, according to an exemplary embodiment.

As shown in FIG. 4, the energy storage and/or generation system 20 is coupled between the cab 16 and the body 14. In some embodiments, the energy storage and/or generation system 20 is coupled to the frame 12. Locating the energy storage and/or generation system 20 between the cab 16 and the body 14 reduces a rear weight of the refuse vehicle 10, thereby reducing component stress of weight bearing members (e.g., a rear axle). Furthermore, centrally locating the energy storage and/or generation system 20 protects the energy storage and/or generation system 20 from damage in the event of a collision. Furthermore, centrally locating the energy storage and/or generation system 20 allows easy modification/retrofitting of existing refuse vehicles to include the energy storage and/or generation system 20. The energy storage and/or generation system 20 may be easily accessed and/or removed from the refuse vehicle 10. For example, the energy storage and/or generation system 20 may include forklift pockets so that a forklift may easily remove the energy storage and/or generation system 20 from the refuse vehicle 10. In some embodiments, the system 20 includes one or more eyelet connectors to receive a lifting hook or similar hoisting attachment. The energy storage and/or generation system 20 may be configured to connect to an external rail system to quickly replace the energy storage and/or generation system 20 by sliding it orthogonally off the refuse vehicle 10.

In some embodiments, the energy storage and/or generation system 20 is configured to dynamically change position on the refuse vehicle 10 based on loading of the refuse vehicle 10. For example, the energy storage and/or generation system 20 may translate horizontally along the frame 12 toward the cab 16 or toward the body 14 to change a weight distribution of the vehicle. In some embodiments, the energy storage and/or generation system 20 includes one or more controllers to measure the weight distribution of the refuse vehicle 10 and adjust a position of the energy storage and/or generation system 20 accordingly.

Figure 5:
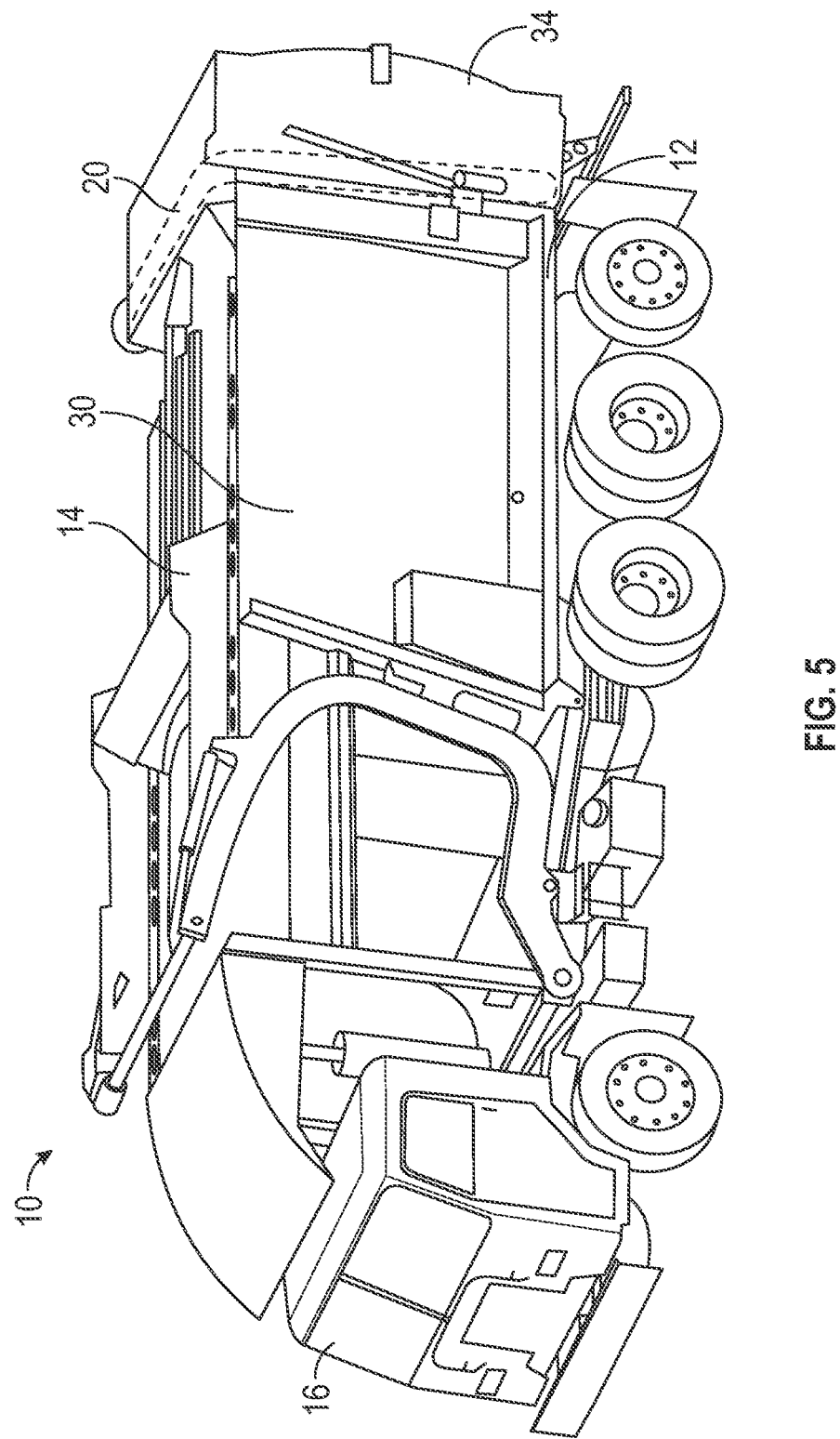
FIG. 5 is the refuse vehicle of FIG. 1 having a tailgate energy storage and/or generation system, according to an exemplary embodiment.

As shown in FIG. 5, the energy storage and/or generation system 20 is coupled to the tailgate 34 of the refuse vehicle 10. In some embodiments, the energy storage and/or generation system 20 is positioned vertically along a rearward side of the refuse compartment 30. In some embodiments, the energy storage and/or generation system 20 is positioned substantially near the base of the tailgate 34 or as part of the tailgate 34. The energy storage and/or generation system 20 may be configured to be accessible via the tailgate 34. For example, a user could open the tailgate 34 to reveal the energy storage and/or generation system 20. In some embodiments, the tailgate 34 includes one or more rotating elements (e.g., hinges, mechanical bearings) to facilitate rotation around a rearward corner of the refuse compartment 30. For example, the tailgate 34 could include one or more hinging mechanisms on a side to allow a user to open the tailgate 34 like a door and gain access to the energy storage and/or generation system 20 located along the frame 12 of the refuse vehicle 10. In some embodiments, the tailgate 34 is a double door. Swinging the tailgate 34 open like a door requires less energy than lifting the tailgate 34.

In some embodiments, the tailgate 34 is fully integrated with the energy storage and/or generation system 20 and is configured to be removable/replaceable. For example, a first tailgate 34 having a first energy storage and/or generation system 20 could be replaced by a second tailgate 34 having a second energy storage and/or generation system 20 when the first energy storage and/or generation system 20 is depleted of energy. Removing and replacing the tailgate 34 may limit loss of vehicle operation due to charging time because the tailgate 34 including the depleted energy storage and/or generation system 20 may be charged separately of the refuse vehicle 10. Furthermore, swappable energy storage and/or generation systems enable a smaller fleet of refuse vehicles to service the same area because the reduced downtime associated with battery charging enables the refuse vehicles to operate for longer periods of time. In some embodiments, a number of racks index one or more battery cells of the energy storage and/or generation system 20.

Figure 6:
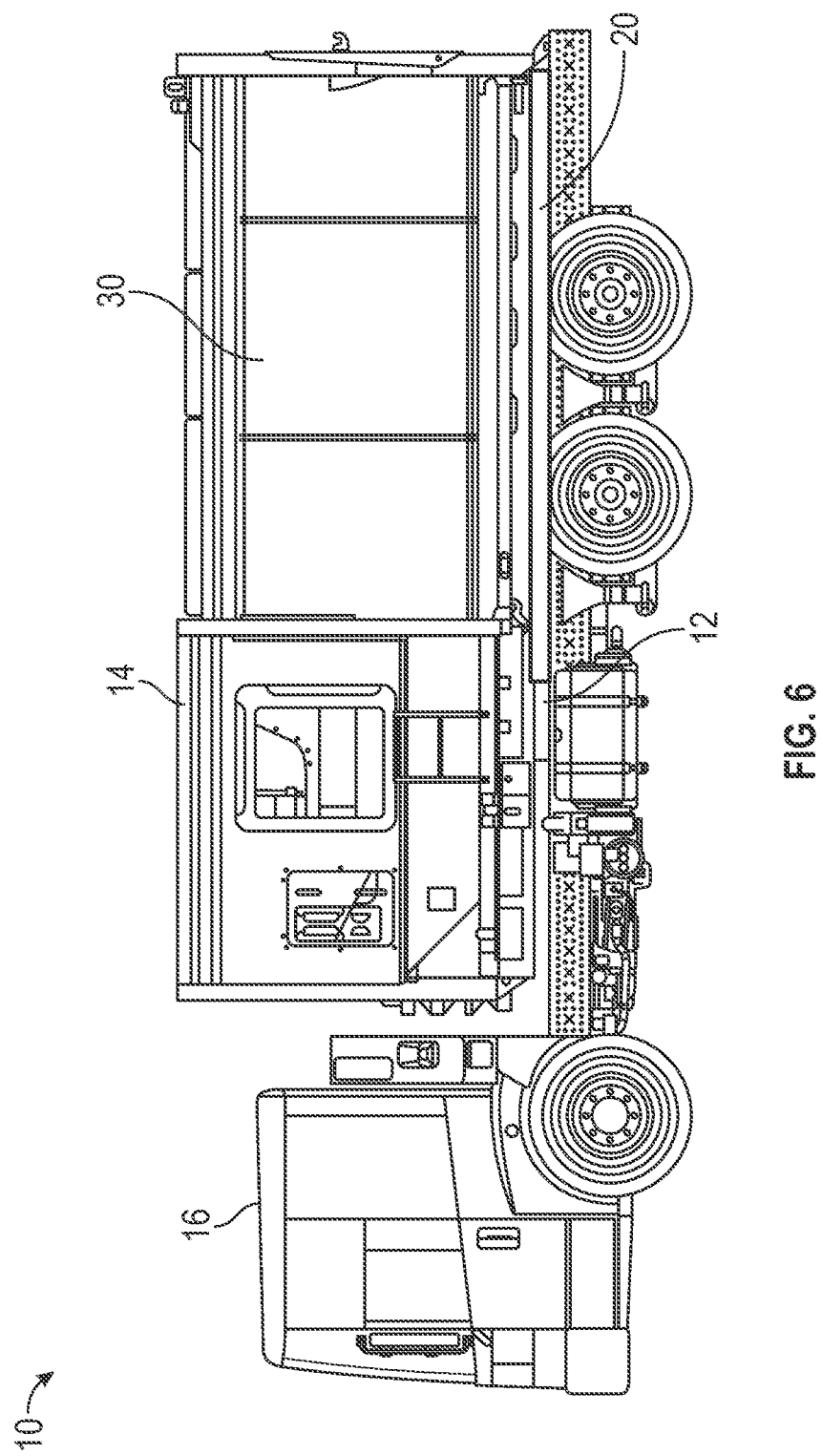
FIG. 6 is the refuse vehicle of FIG. 1 having a frame energy storage and/or generation system, according to an exemplary embodiment.

As shown in FIG. 6, the energy storage and/or generation system 20 is coupled between the body 14 and the frame 12. As described above, in some embodiments, the energy storage and/or generation system 20 may be configured to translate horizontally along the frame 12 of the refuse vehicle 10. For example, the energy storage and/or generation system 20 could move between a forward portion and a rearward portion of the body 14 of the refuse vehicle 10 such that the refuse vehicle 10 is evenly loaded. As described above, in some embodiments, the energy storage and/or generation system 20 is removable and/or replaceable. The energy storage and/or generation system 20 may be accessed via a door on a side of the body 14 or via the tailgate 34. Similarly, the energy storage and/or generation system 20 may be removed and/or replaced by another energy storage and/or generation system. Alternatively, one or more individual battery cells of the energy storage and/or generation system 20 could be replaced. In some embodiments, the energy storage and/or generation system 20 can be accessed by removing the refuse compartment 30. For example, a refuse vehicle with a removable refuse compartment (e.g., a container truck) may remove the refuse compartment to reveal the energy storage and/or generation system 20. In some embodiments, the energy storage and/or generation system 20 is coupled to the refuse compartment 30 itself and can be removed with the refuse compartment 30. For example, a refuse vehicle could swap a first full refuse compartment with a first depleted energy storage and/or generation system for a second empty refuse compartment with a second charged energy storage and/or generation system.

Figure 7A:
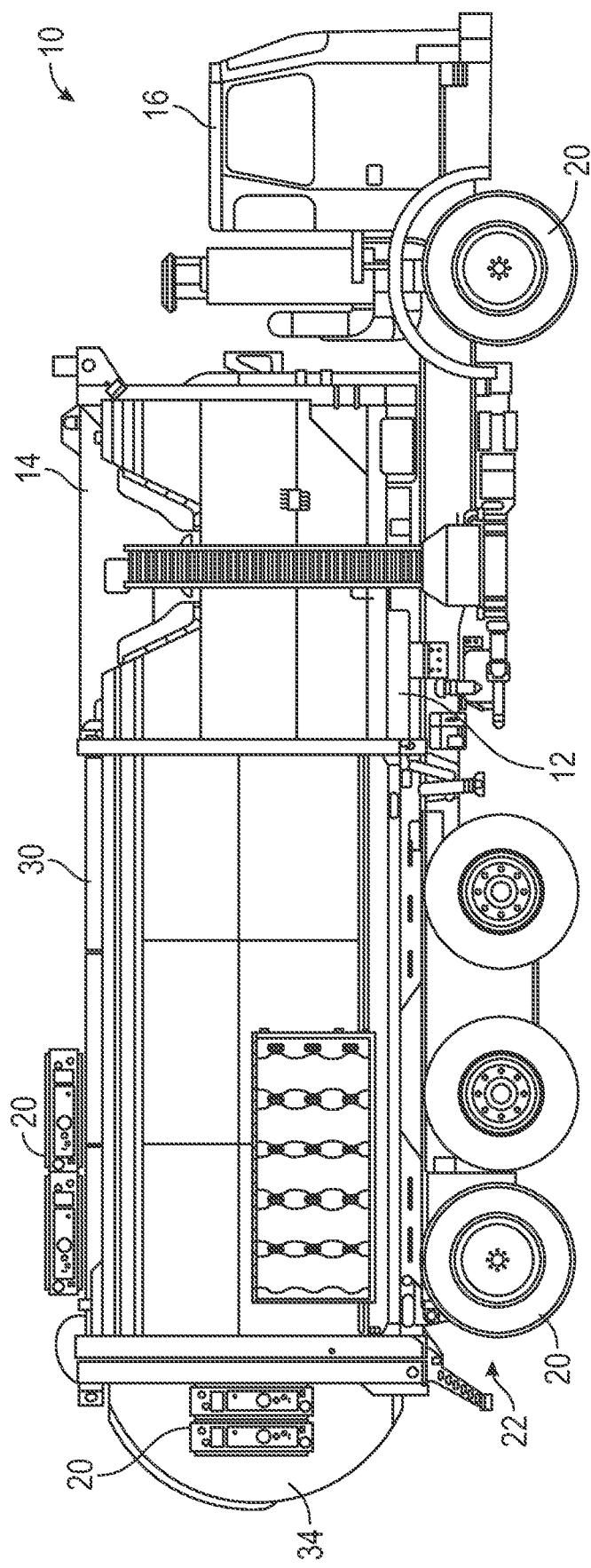
FIGS. 7A-8B are the refuse vehicle of FIG. 1 having a distributed energy storage and/or generation system, according to several exemplary embodiments.
Figure 7B:
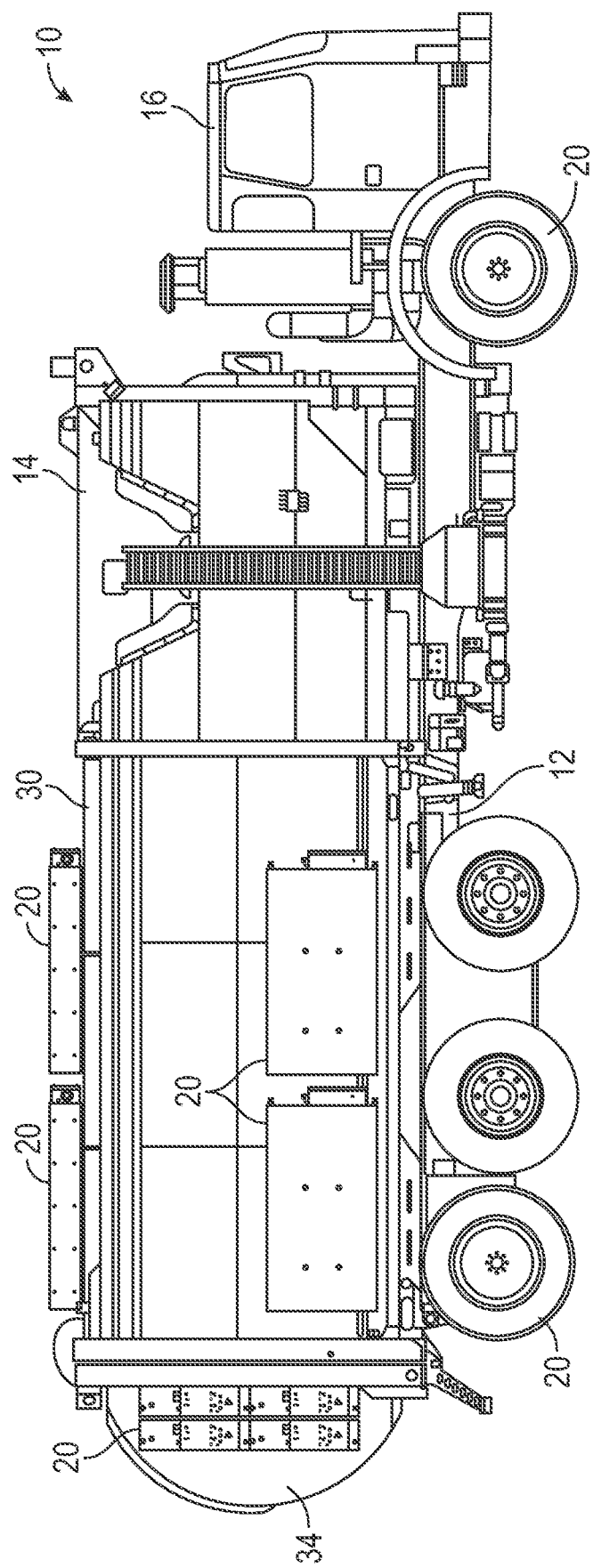
Figure 7C:
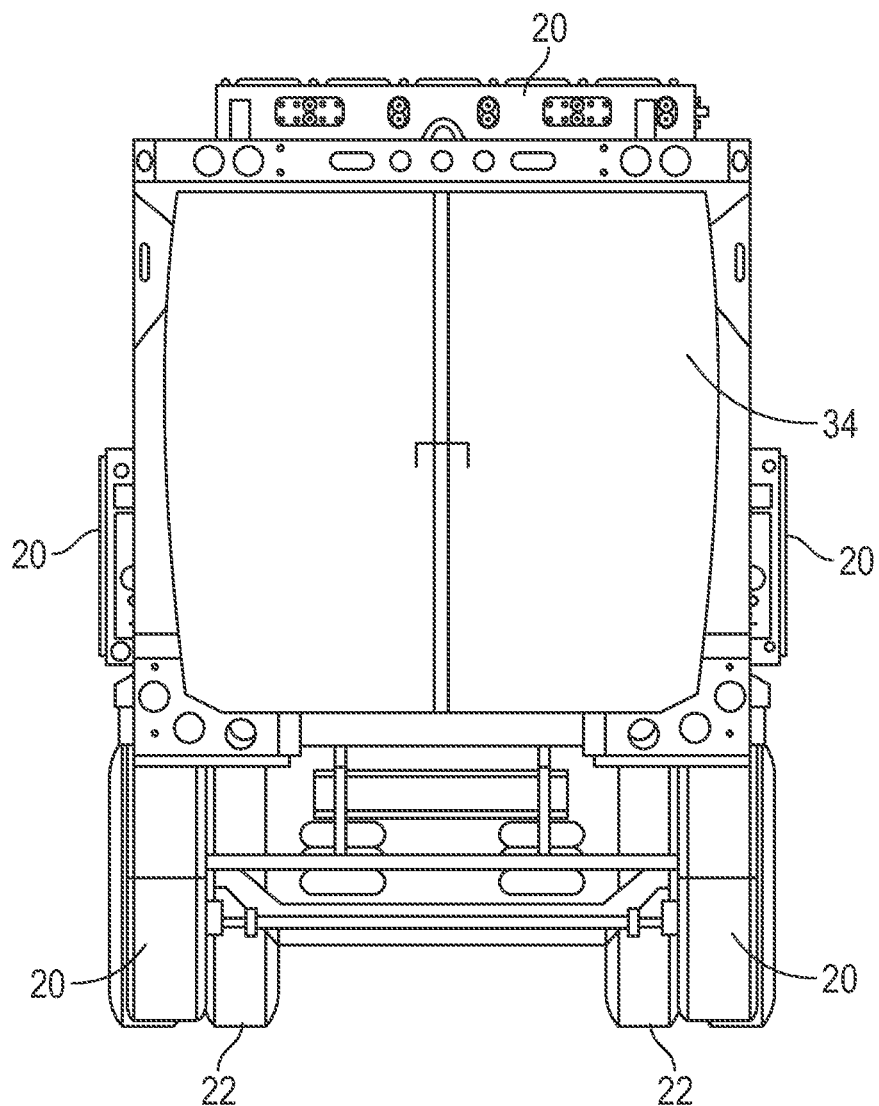
Figure 8A:
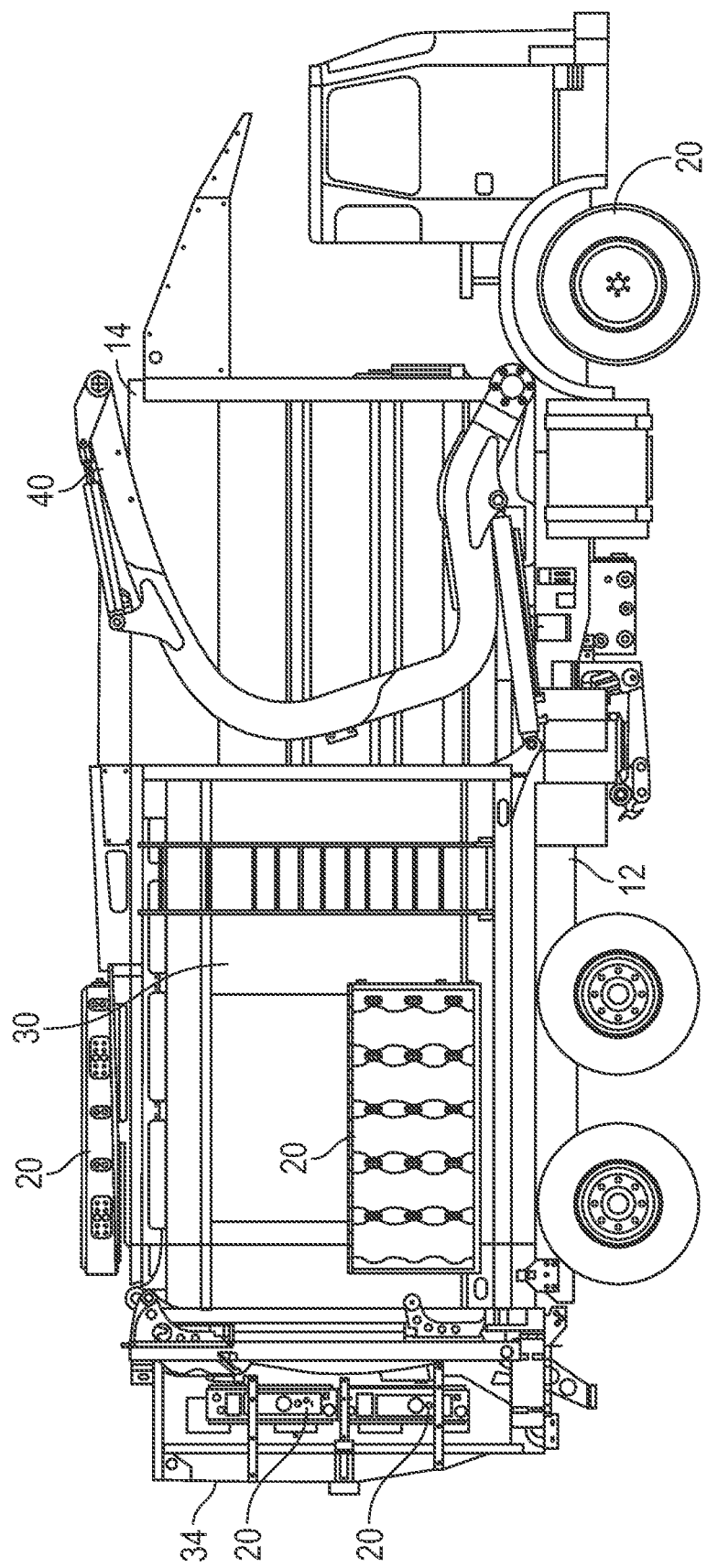
Figure 8B:
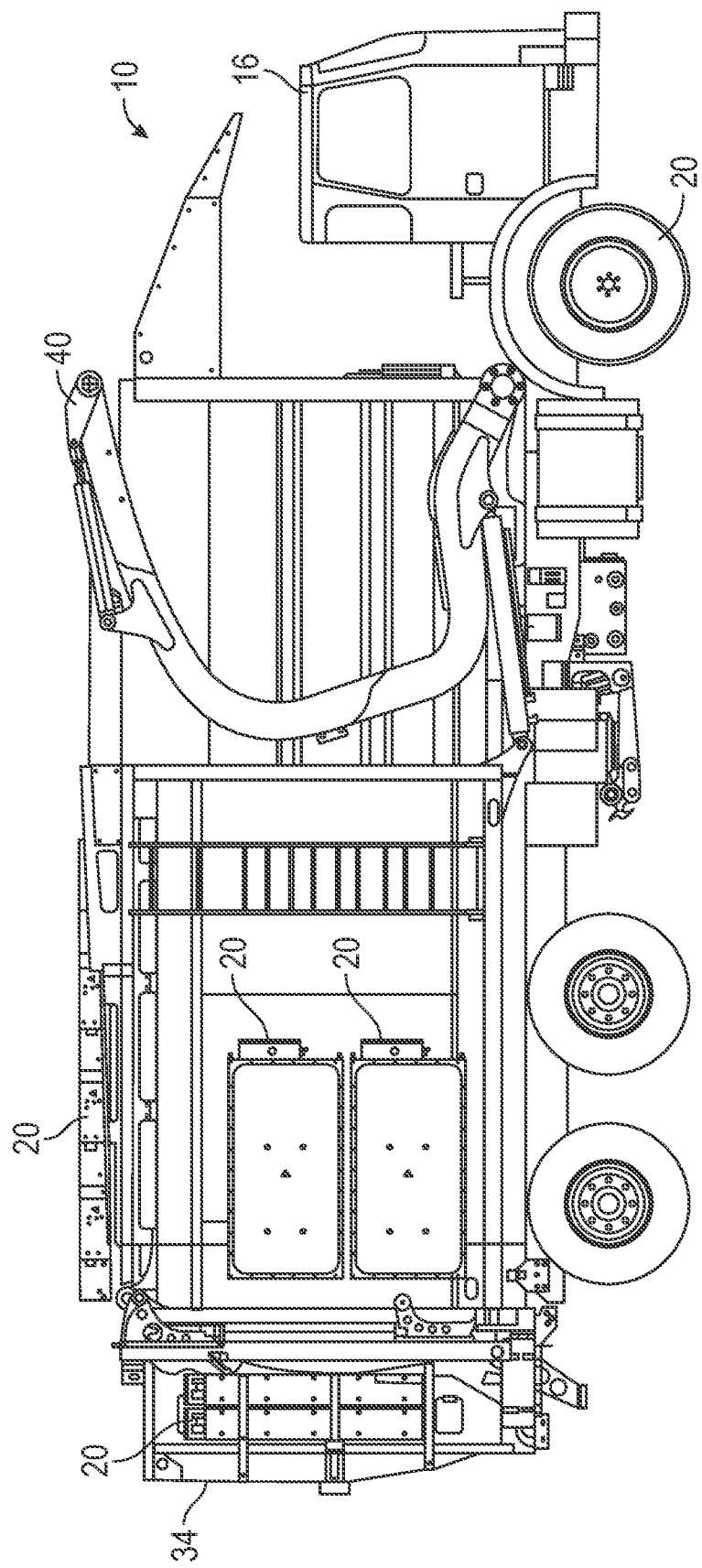

Referring now to FIGS. 7A-8B, several illustrations of an exemplary placement of the energy storage and/or generation system 20 is shown, according to several exemplary embodiments. In various embodiments, the energy storage and/or generation system 20 is coupled to a rearward top portion of the refuse vehicle 10 (e.g., above the refuse compartment 30, etc.). Additionally or alternatively, the energy storage and/or generation system 20 is coupled to a rearward portion of the refuse vehicle 10. For example, the energy storage and/or generation system 20 may be coupled to the tailgate 34 and/or a rearward portion of the refuse compartment 30 (e.g., as shown in FIGS. 7A-7C). As another example, the energy storage and/or generation system 20 may be coupled to a vertical rear surface of the refuse compartment 30. In some embodiments, the energy storage and/or generation system 20 or components thereof are coupled to the wheel 22. For example, an energy storage cell of the energy storage and/or generation system 20 may be coupled to a hub of the wheels 22 and a power converter of the energy storage and/or generation system 20 may be coupled to a top rearward portion of the refuse container 30. In some embodiments, the energy storage and/or generation system 20 is coupled to a front and rear wheelset of the refuse vehicle 10 (e.g., as shown in FIGS. 7A-7C). In various embodiments, placement of the energy storage and/or generation system 20 as shown in FIGS. 7A-7C facilitates shifting weight rearward on the refuse vehicle 10, thereby reducing strain on forward load bearing components (e.g., a front axle, etc.). In some embodiments, the placement of the energy storage and/or generation system 20 shown in FIGS. 7A-7C is preferred for a rear-loading refuse vehicle 10. In various embodiments, the energy storage and/or generation system 20 includes a different number and/or arrangement of components than shown explicitly in the FIGURES. For example, the energy storage and/or generation system 20 may include a first component coupled to an exterior hub surface of the front wheels 22 electrically coupled to a second component integrated with the tailgate 34. In some embodiments, the placement of the energy storage and/or generation system 20 shown in FIGS. 8A-8B is preferred for a front-loading refuse vehicle 10 and/or a side-loading refuse vehicle 10. In various embodiments, the energy storage and/or generation system 20, or components thereof, are detachable from the refuse vehicle 10 as described in detail above.

Figure 9A:
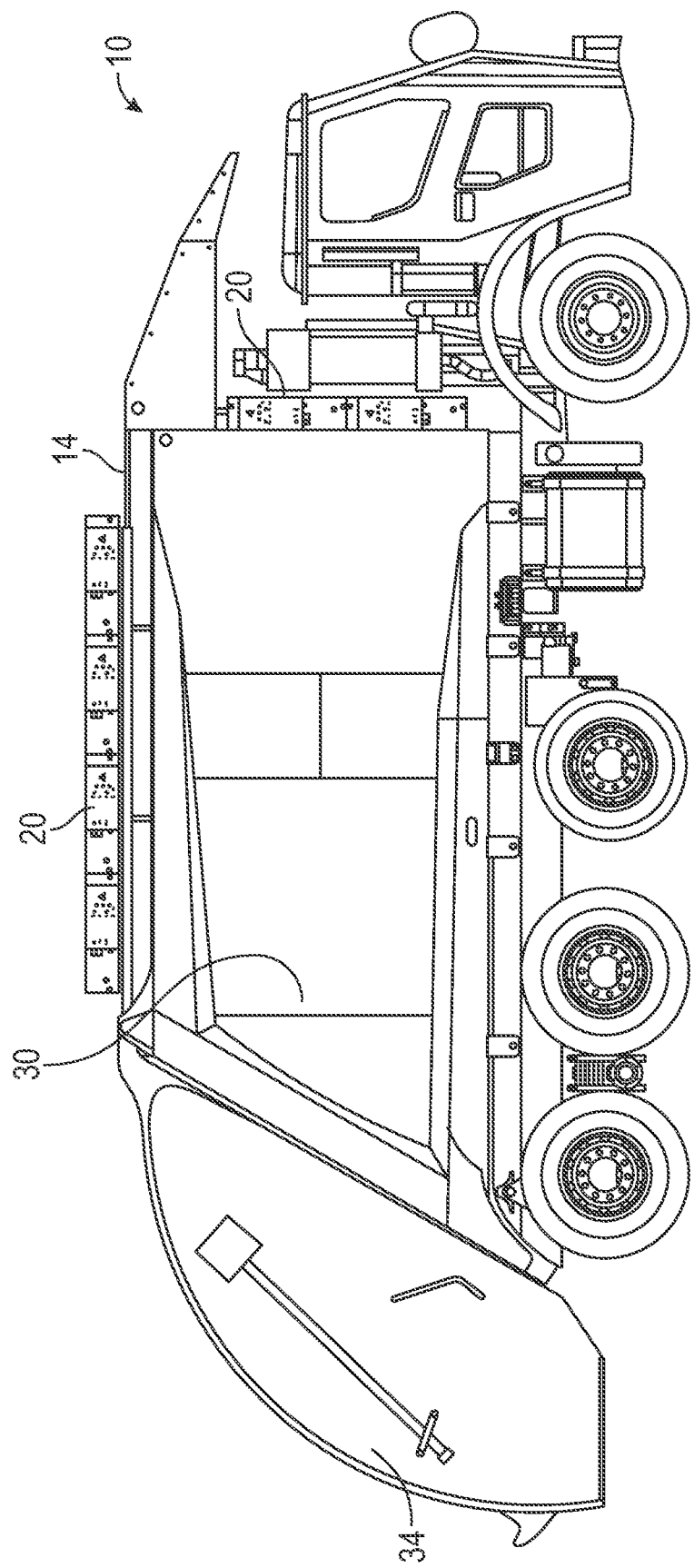
FIGS. 9A-9B are the refuse vehicle of FIG. 1 having a top energy storage and/or generation system, according to several exemplary embodiments.
Figure 9B:
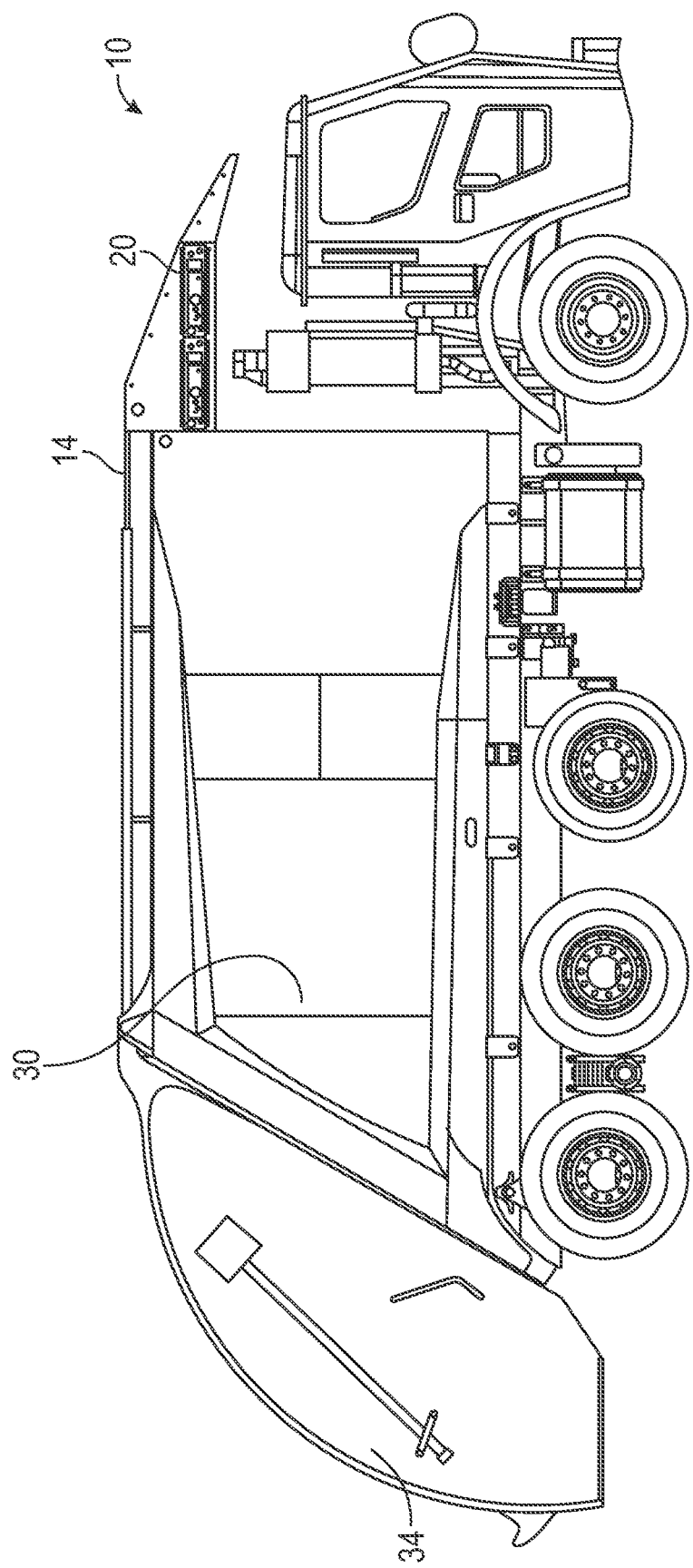

Referring now to FIGS. 9A-9B, several illustrations of another exemplary placement of the energy storage and/or generation system 20 is shown, according to several exemplary embodiments. In various embodiments, the energy storage and/or generation system 20 is coupled to a top portion of the refuse vehicle 10. For example, the energy storage and/or generation system 20 may be coupled to a top portion of refuse compartment 30 and/or above the cab 16 (e.g., as shown in FIGS. 9A-9B). In some embodiments, the energy storage and/or generation system 20 is coupled to a canopy (or other structural element) located above the cab 16. Additionally or alternatively, the energy storage and/or generation system 20, or components thereof, may be coupled to the wheels 22. For example, a first component of the energy storage and/or generation system 20 (e.g., a battery cell, etc.) may be coupled to an exterior hub region of the wheels 22 and a second component of the energy storage and/or generation system 20 (e.g., a power converter, etc.) may be coupled to a structural element (e.g., a portion of frame 12, etc.) above the cab 16. In some embodiments, the placement of the energy storage and/or generation system 20 shown in FIGS. 9A-9B is preferred for a rear-loading refuse vehicle 10. In various embodiments, the placement of the energy storage and/or generation system 20 as shown in FIGS. 9A-9B facilitates moving weight (e.g., battery weight, etc.) forward on the refuse vehicle 10 (e.g., toward the cab 16 and away from the tailgate 34, etc.), thereby reducing stress on rear load-bearing components (e.g., a rear axle, etc.).

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the refuse vehicle 10 and the systems and components thereof as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:

1. A refuse vehicle, comprising:
a chassis comprising a frame member;
one or more wheels;
a body assembly coupled to the frame member of the chassis, the body assembly comprising a body defining a refuse compartment, a bottom surface of the body assembly being defined by a point at which the body assembly contacts a top of the frame member; and
a plurality of battery cells disposed in a modular housing, an upper most surface of the modular housing spaced a distance below the bottom surface of the body assembly, the plurality of battery cells positioned directly above axles of rear wheels of the refuse vehicle, wherein the plurality of battery cells supply electrical power to a drive motor to drive the one or more wheels, a packing actuator, and at least one of a lift actuator, a tailgate actuator, or a grabber actuator, wherein the plurality of battery cells are removable from and insertable into an end of the modular housing without removing the modular housing from the refuse vehicle.

2. The refuse vehicle of claim 1, further comprising an electric energy system, the electric energy system comprising the plurality of battery cells and control hardware, the electric energy system positioned lower than the bottom surface of the body assembly and at least a portion of the electric energy system extends lower than the frame member of the chassis;
wherein the plurality of battery cells of the electric energy system are replaceable.

3. The refuse vehicle of claim 1, wherein the refuse vehicle is fully powered by the plurality of battery cells.

4. The refuse vehicle of claim 1, wherein at least a portion of the plurality of battery cells extends lower than a bottom of the frame member of the chassis.

5. The refuse vehicle of claim 1, wherein the plurality of battery cells are configured to provide electrical energy to an electric actuator of the refuse vehicle for a refuse collection operation.

6. The refuse vehicle of claim 1, wherein at least a portion of the modular housing extends lower than the frame member of the chassis.

7. The refuse vehicle of claim 1, wherein the plurality of battery cells are positioned beneath the compartment of the body.

8. The refuse vehicle of claim 1, wherein the plurality of battery cells are positioned at a vertical position that is at least partially above a tractive element of the refuse vehicle.

9. A refuse vehicle, comprising:
a chassis comprising a frame member;
one or more wheels;
a body assembly coupled to the frame member, the body assembly comprising a body defining a compartment, a bottom of the body assembly being defined by a point at which the body assembly couples or contacts a top of the chassis; and
a plurality of battery cells disposed in a modular housing, an upper most point of the modular housing spaced a distance below the bottom of the body assembly, the compartment of the body, and a portion of the chassis, the plurality of battery cells positioned along the chassis at a position directly above a rear axle of the refuse vehicle, wherein the plurality of battery cells supply electrical power to a drive motor to drive the one or more wheels, a packing actuator, and at least one of a lift actuator, a tailgate actuator, or a grabber actuator, wherein the plurality of battery cells are removable from and insertable into an end of the modular housing without removing the modular housing from the refuse vehicle.

10. The refuse vehicle of claim 9, wherein the refuse vehicle is fully powered by the plurality of battery cells.

11. The refuse vehicle of claim 9, wherein the refuse vehicle does not include a combustion engine.

12. The refuse vehicle of claim 9, wherein at least a portion of the modular housing extends lower than the frame member of the chassis and the modular housing extends in a longitudinal direction along a length of the body.

13. The refuse vehicle of claim 9, wherein the plurality of battery cells are positioned at a vertical position that is at least partially above a tractive element of the refuse vehicle.

14. The refuse vehicle of claim 9, wherein the plurality of battery cells are coupled with a forwards lower portion of the body.

15. The refuse vehicle of claim 14, wherein the forwards lower portion of the body is proximate a cab of the refuse vehicle.

16. A refuse vehicle, comprising:
a chassis;
one or more wheels;
a body coupled to the chassis, the body defining a compartment, a bottom of the body contacting a top of the chassis; and
a plurality of battery cells disposed in a modular housing positioned a distance beneath the bottom of the body at a position directly above a rear axle of the refuse vehicle, wherein at least a portion of the plurality of battery cells is positioned vertically above at least a portion of a tractive element of the refuse vehicle, wherein the plurality of battery cells supply electrical power to a drive motor to drive the one or more wheels, a packing actuator, and at least one of a lift actuator, a tailgate actuator, or a grabber actuator, wherein the plurality of battery cells are removable from and insertable into an end of the modular housing without removing the modular housing from the refuse vehicle.

17. The refuse vehicle of claim 16, wherein the plurality of battery cells are positioned laterally outwards of a lateral side of the chassis.

18. The refuse vehicle of claim 16, wherein the refuse vehicle is a fully electric refuse vehicle configured to consume electrical energy provided by the plurality of battery cells.

\* \* \* \* \*